(12) United States Patent
McCullough et al.

(10) Patent No.: US 7,081,208 B2
(45) Date of Patent: Jul. 25, 2006

(54) METHOD TO BUILD A MICROFILTER

(75) Inventors: Kenneth J McCullough, Fishkill, NY (US); Wayne M Moreau, Wappingers Falls, NY (US); Keith R Pope, Danbury, CT (US); Robert J Purtell, Mohegan Lake, NY (US); John P Simons, Wappingers Falls, NY (US); William A Syverson, Colchester, VT (US); Charles J Taft, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 10/320,834

(22) Filed: Dec. 16, 2002

(65) Prior Publication Data

US 2004/0112865 A1   Jun. 17, 2004

(51) Int. Cl.
*B44C 1/22* (2006.01)
*B31D 3/00* (2006.01)

(52) U.S. Cl. .............................. 216/56; 216/83; 216/87; 216/94; 134/1; 428/446; 264/82; 264/344

(58) Field of Classification Search .................. 216/83, 216/87, 94, 2, 56; 428/446; 134/1; 264/82, 264/344
See application file for complete search history.

(56) References Cited

U.S. PATENT DOCUMENTS

| 4,092,456 A | * | 5/1978 | Newman et al. ............... 521/55 |
| 4,196,070 A | | 4/1980 | Chao et al. .................. 204/266 |
| 4,702,836 A | * | 10/1987 | Mutoh et al. .......... 210/500.23 |
| 4,832,997 A | * | 5/1989 | Balanzat et al. ............. 428/131 |
| 4,859,715 A | | 8/1989 | Dubrow et al. ............. 521/180 |
| 5,236,602 A | * | 8/1993 | Jackson ...................... 210/748 |
| 5,444,097 A | | 8/1995 | Tkacik ........................ 521/61 |
| 5,665,234 A | | 9/1997 | Dilenge et al. ............. 210/496 |
| 5,834,114 A | * | 11/1998 | Economy et al. ........... 428/368 |
| 5,985,164 A | | 11/1999 | Chu et al. ..................... 216/41 |
| 6,245,698 B1 | | 6/2001 | Pope et al. ................... 501/12 |
| 6,565,764 B1 | * | 5/2003 | Hiraoka et al. ............... 216/56 |

* cited by examiner

*Primary Examiner*—Shamim Ahmed
(74) *Attorney, Agent, or Firm*—DeLio & Peterson, LLC; John J. Tomaszewski; Lisa U. Jaklitsch

(57) ABSTRACT

Methods are provided for making microfilters by subtractive techniques which remove a component or part of a filter material to form pores in the filter material and additive techniques which deposit a filter material onto a porous underlying substrate. All the methods employ a supercritical fluid or mixture which have very high solvency properties and low viscosity and $CO_2$ is the preferred supercritical fluid.

3 Claims, No Drawings

METHOD TO BUILD A MICROFILTER

BACKGROUND OF THE INVENTION

1. Field of the Invention

The present invention relates generally to microfilters and, in particular, to a method for making a microfilter using a supercritical fluid mixture to selectively remove soluble portions of a filter material composite thus forming micropores in the matrix or to add a filter material from the supercritical fluid mixture to a porous matrix forming the microfilter.

2. Description of Related Art

Filtration devices are used in a variety of industrial fields ranging from the electronics industry to the pharmaceutical industry. Depending on the application, the filter properties distribution and control of the pore size affects the relative filtration rate, durability and chemical and mechanical resistance. For convenience, the following description will be related to the electronics industry, and in particular, to the use of microfilters in the fabrication of semiconductor devices.

Microfilters are used in a variety of applications in the fabrication of semiconductor devices including purification of waste streams, filtration of process streams, photoresist manufacturing and recirculation baths. With the continuing decrease in the size of semiconductor devices however, there is a need for microfilters having finer pore size and better control of the pore size.

It is known to form pores in filter substrates by leaching of a filler material in the filter material matrix. U.S. Pat. No. 3,281,511 discloses a filler such as sodium chloride which is mixed with a polymer to form a dough. The dough is sintered and the pores are formed by dissolving the sodium chloride filler material. Leach processes such as this, however, do not provide commercial microfilters which require finer pore sizes.

Bearing in mind the problems and deficiencies of the prior art, it is therefore an object of the present invention to provide methods for making microfilters.

It is another object of the present invention to provide methods for making microfilters using a subtractive process.

A further object of the invention is to provide methods for making microfilters using an additive process.

Still other objects and advantages of the invention will in part be obvious and will in part be apparent from the specification.

SUMMARY OF THE INVENTION

Broadly stated, the present invention utilizes a supercritical fluid such as $CO_2$, alone or in combination with a solvent, to remove material from a filter material matrix (subtractive method) and form pores in the filter material or to add a filter material to an underlying porous substrate (additive method).

The above and other objects and advantages, which will be apparent to one of skill in the art, are achieved in the present invention which is directed to, in a first aspect, a method for making a microfilter comprising the steps of:

forming a mixture of at least two materials, one of which will be a filter material to form the filter and the other material being a pore forming material which is removed from the mixture to form pores in the filter material;

forming the mixture into a desired filter shape; and contacting the filter shape mixture with a solvent and supercritical fluid mixture, the solvent leaching the pore forming material from the filter shaped mixture and forming pores in the filter material and forming the microfilter.

In another aspect of the invention, a method is provided for making a microfilter comprising the steps of:

forming a filter material into a desired filter shape;

exposing the filter shaped material to radiation, such as ionizing radiation, to degrade and/or fragment the filter shaped material; and contacting the exposed filter shaped material, preferably simultaneously, with a supercritical fluid, and for some methods a solvent for the degraded or fragmented material, to remove the degraded and/or fragmented filter material forming pores in the filter shaped material and forming the microfilter.

In another aspect of the invention a method is provided for making a microfilter comprising the steps of:

forming a filter material into a desired filter shape; and exposing the filter shaped material to a mixture of a reagent and a supercritical fluid to remove a part of the filter shaped material which part reacts with the reagent forming pores in the filter shaped material and forming the microfilter.

In a further aspect of the invention a method is provided for making a microfilter comprising the steps of:

providing an underlying porous filter substrate such as a matrix, scaffolding or underwiring having open areas and on which substrate a filter material will be deposited;

forming a mixture of a filter material and a supercritical fluid; and contacting the porous filter substrate with the filter material and supercritical fluid mixture depositing the filter material on the substrate; and continuing the contacting until a microfilter is formed.

In another aspect of the invention a method is provided for forming a microfilter comprising the steps of:

providing a chemically functional underlying porous filter substrate such as a layered film, polymer, scaffolding or underwiring having open areas and on which a substrate filter material will be deposited;

forming a mixture of a filter material and a supercritical fluid, which filter material polymerizes or reacts with the chemically functional porous substrate;

contacting the chemically functional underlying porous filter substrate with the mixture so that the filter material in the mixture reacts with the underlying porous filter substrate and attaches thereto; and continuing the above contacting until a microfilter is formed.

DESCRIPTION OF THE PREFERRED EMBODIMENT(S)

There are two general methods of preparing an article by methods of this invention:

Additive Method

This can be done either physically or chemically.

The Physically Additive method involves the spraying, eluting or adsorbing of the filter material from a dispersion (mixture) of the filter material in a supercritical fluid, and it includes, for example, spraying of film or filter material and adsorption from the liquid dispersion when it contacts an underlying porous substrate such as a matrix, scaffolding or underwiring. In this method, the progress of the operation can be monitored by pressure drop, elapsed time/flow rate, optical density, or other suitable measurement of the process.

The Chemically Additive method involves the localized polymerization or chemical deposition of filter material in a supercritical fluid mixture from a molecular precursor(s), and occurs within a preformed chemically functional underlying porous substrate such as a matrix, layered film, polymer matrix, scaffolding or underwiring. The method proceeds by chemical reaction and attachment of the filter material to the porous substrate. This reaction includes processes which are initiated or accelerated by, or require a photochemical or sonochemical step. The underlying porous substrate is permeable to a supercritical fluid, which facilitates the reaction throughout the porous substrate structure.

Typical underlying porous substrates include a porous silica or ceramic filter and a Teflon membrane.

Subtractive Method

This can be done either radiatively, physically or chemically.

The Radiatively Subtractive method comprises exposing a shaped filter material to ionizing radiation during penetration of the material by a supercritical fluid which can dissolve and remove fragments resulting from the radiative degration or fragmentation of the shaped filter material. A cosolvent can be used in the supercritical fluid to dissolve and remove the fragments.

The Physically Subtractive method comprises the etching or dissolution of a pore forming component of a preformed composite structure comprising the pore forming component and a filter material. For example, acid dissolution of metal particles from the interior of a filter material that is permeable by a supercritical fluid containing the acid etchant. Alternatively, dissolution of a compound or polymer phase that is preferentially soluble in a solvent that can be dissolved or dispersed in a supercritical fluid. For example, dissolution of a low molecular-weight polystyrene phase in a composite structure of polyarylethersulfone by toluene dissolved in supercritical carbon dioxide.

The Chemically Subtractive method comprises a molecular reaction between a component in a preformed composite structure with a chemical reagent dispersed in a penetrating supercritical fluid that liberates an attached or imbedded fragment of the composite and passes it out of the composite structure to form the porous network. An example of this would be selective ozonolysis of unsaturated sites in an organic branched polymer composite.

In one exemplary aspect, this invention is directed to a method of making a microfilter of any shape by casting or molding the shape from a mixture of two materials. One material is a pore forming material which is removable by using an etchant or selective solvent that is dispersible in a supercritical fluid. The other material is one that will comprise the bulk material of the finished filter. In this method the materials are blended together and cast to form the basic shape of the filter article. The cast or molded shape is contacted by the etchant or solvent which is dispersed in a supercritical fluid to permeate the article and removes the pore forming material throughout the bulk material of the article. The amount and particle distribution of the pore forming material in the bulk filter material will determine the pore size and distribution of pores in the finished filter article. After contact treatment, the article is decompressed and purged with $CO_2$ or inert solvent to remove traces of the pore forming material. The filter can now be finished according to any conventional manufacturing step to form the finished microfilter.

The term "supercritical fluid" is used herein to denote a material which is under conditions of not lower than a critical temperature, $T_e$, and not less than a critical pressure, $P_e$ in a pressure-temperature diagram of an intended compound. The preferred supercritical fluid employed in the present invention is $CO_2$ which may be used alone or in an admixture with another additive such as Ar, $NH_3$, $CH_4$, $CHF_3$, $C_2H_6$, n-$C_3H_8$, $H_2O$, $N_2O$ and the like. Surfactants containing at least one $CF_x$ functional group may also be used in conjunction with the supercritical fluid.

The term supercritical fluid refers to the state of matter of a material above its critical point, i.e., a critical temperature, $T_e$, and critical pressure, $P_e$, at which two phases of a substance, in equilibrium with each other, become identical, forming one phase. Any supercritical fluid known to those skilled in the art such as $CO_2$ and/or Ar may be used in the present invention. The preferred supercritical fluid is $CO_2$ which may be used alone or in an admixture with one or more additives selective from the group consisting of Ar, $N_2O$, $NH_3$, $C_2H_4$, $CHF_3$, $C_2H_6$, $H_2O$, n-$C_3H_8$ perfluorinated solvents, and the like.

Any grade of supercritical fluid can be employed in the present invention. If a low grade of supercritical fluid is employed which contains a high amount of impurities therein, the supercritical fluid can be first purified to remove the impurities using techniques well known to those skilled in the art. For instance, a low-grade supercritical fluid could be purified by passing it through a silica gel column prior to entering the processing chamber.

The supercritical fluid can also be combined with additives or surfactants which would aid in penetrating the filter material. Suitable additives include, but are not limited to, those mentioned hereinabove. Of these additives, $H_2O$ is most particularly preferred.

Typically, in the present invention, the supercritical fluid is pre-pressurized to a pressure of about 1070 psi to 6000 psi. More preferably, the supercritical fluid is pre-pressurized to a pressure of about 3000 psi before entering a processing chamber which is a conventional pressure vessel. The pre-pressurized supercritical fluid is then transferred to the processing chamber which contains a filter material for a subtractive process or an underlying porous substrate for an additive process as discussed above.

Typically, the pressure for $CO_2$ within the process chamber during making of the microfilter is about 1070 psi to about 6000 psi. More preferably, the pressure within the process chamber is about 3000 psi.

The temperature within the processing chamber is above 31° C. and generally about 40° C. to about 80° C. More preferably, the temperature within the process chamber is about 40° C.

To ensure effective removal of the pore forming material in a subtractive process, or deposition of a filter material on a porous underlying substrate in an additive process, the filter material or underlying porous substrate is exposed to the supercritical fluid and/or mixture under the above conditions for a sufficient time to form the desired microfilter. Typically about 2 minutes to about 2 hours, e.g., about 1 hour.

The supercritical fluid exiting the process chamber may be cleaned, as described above, and recycled into the apparatus so as to form a closed reactor system. Such a closed reactor system would generally reduce the processing cost in making the microfilter.

The filter material or underlying porous substrate is placed within a pressure chamber. The pressure chamber is then pressurized and supercritical carbon dioxide and optionally a solvent (or deposition additive) are introduced into the pressure chamber.

The supercritical carbon dioxide and the solvent (or deposition additive) are maintained in contact with the filter material or underlying porous substrate until the microfilter is formed. The pressure chamber is then flushed and vented.

The present invention utilizes the high solvency and low viscosity properties of supercritical fluids, such as carbon dioxide to assist in making microfilters. In the preferred subtractive embodiment, a small amount of a chemical, i.e., a solvent or a solvent mixture, is added to the supercritical $CO_2$ and is contacted with the filter material to be formed into a filter and is then recycled back to a carbon dioxide compressor for reuse.

The chemical is soluble or insoluble in carbon dioxide. The high solvency and solubilizing ability of the supercritical carbon dioxide makes this method fast, safe, and very quick. High turbulence at the substrate surface in conjunction with hyper-efficient mass transport of a chemical co-solvent package effectively forms the microfilter.

The preferred subtractive embodiment of the process of the present invention is that the shaped filter material composite is placed in a pressure chamber. The pressure chamber is then sealed and pressurized with carbon dioxide. As the pressure inside the pressure chamber builds, the carbon dioxide becomes liquid and then reaches supercritical temperature and pressure. Typical conditions for this process range from 31 to 100° C. and 1070 to 6000 psig. When the desired conditions are reached, a small amount of the chemical or solvent is introduced into a supercritical carbon dioxide stream and thus added into the pressure chamber. Typical types and amount of chemicals in the supercritical fluid are: (a) 1–15 wt % of Ar, $N_2O$, $NH_3$, $C_2H_4$, $CHF_3$, $C_2H_6$, $H_2O$, n-$C_3H_8$, acetone, hexane, perfluorinated solvents and the like. The amount of pore forming material is typically less than 25% by weight of the composite.

For Additive Process
1. Vinyltriacetoxysilane is dissolved in SCF $CO_2$ with 1% glacial acetic acid and heated to 150° C. to impregnate a porous silica or ceramic filter to form a microfilter.
2. A Teflon membrane (polytetrafluoroethylene) is reacted with styrene in SCF $CO_2$ and then sulfonated to improve wettability.

For Subtractive Process
1. A polypropylene membrane is molded with 10% paraffin wax by wt. and then extracted in SCF $CO_2$ with 3% hexane as co-solvent by volume.
2. A polyarylethersulfone membrane is molded with 5% by wt. polyperfluoroacrylates (C1–C6) and irradiated with ionizing radiation such as gamma or electron or ion beam and then extracted with SCF $CO_2$ with 5% by wt. acetone as co-solvent.

In general for subtractive solvent cast mixtures of filter materials or injection molded membranes mixed with SCF $CO_2$ polymers such fluorine containing perfluoroethers, perfluoroacrylates, siloxy containing such as polydimethylsiloxane or silylated phenolic resins and irradiated perfluorovinylidine fluoride, or polytetrafluoroethylene where the additive or blend partner or radiation products are soluble in SCF $CO_2$ or Liquid $CO_2$ admixed with co-solvents.

Microfilters typically have a pore size less than 1 micron in diameter, i.e., less than 0.01 micron, but the range can vary widely.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for making a microfilter comprising forming a shaped filter material matrix by molding the matrix from a mixture of at least two materials, one of which will be a filter material to form the filter and the other material being a pore forming material which is removed from the mixture to form pores in the filter material wherein a component of the matrix is removed by contacting the shaped filter material matrix with a supercritical fluid alone or in combination with a solvent.

2. The method of claim 1 wherein the shaped filter material matrix is exposed to radiation to degrade and/or fragment the shaped filter material.

3. The method of claim 1 wherein the shaped filter material matrix is exposed to a mixture of a reagent and a supercritical fluid to remove a part of the filter shaped material which part reacted with the reagent, forming pores in the filter shaped material and forming the microfilter.

* * * * *